United States Patent
Konishi

[11] 3,842,467
[45] Oct. 22, 1974

[54] HELICAL ELEMENTS FOR A LINE CONDUCTOR

[76] Inventor: Motoyasu Konishi, 3-4-18 Nakata, Tarumi-ku, Kobe, Japan

[22] Filed: June 14, 1972

[21] Appl. No.: 262,664

[52] U.S. Cl.................. 24/131 C, 174/79, 403/209
[51] Int. Cl. ........................................... F16g 11/00
[58] Field of Search....... 24/131 C, 243 WC, 129 C; 174/173, 79, DIG. 12

[56] References Cited
UNITED STATES PATENTS

| | | | |
|---|---|---|---|
| 2,289,710 | 7/1942 | Kelso | 24/131 C |
| 2,888,726 | 6/1959 | Smith | 174/79 |
| 2,912,816 | 11/1959 | Kitselman | 174/79 |
| 2,998,696 | 9/1961 | Payer | 24/129 C |
| 3,183,658 | 5/1965 | Peterson | 174/173 |
| 3,355,542 | 11/1967 | Finn | 24/131 C |

Primary Examiner—Paul R. Gilliam
Assistant Examiner—Darrell Marquette
Attorney, Agent, or Firm—John Joseph Hall

[57] ABSTRACT

A helical element for supporting transmission line conductors provided with a projecting spur on its circumference which prevents the line conductor from slipping out of the helical element.

9 Claims, 10 Drawing Figures

PATENTED OCT 22 1974　　　　　　　　　　3,842,467

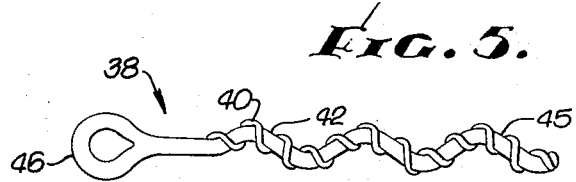
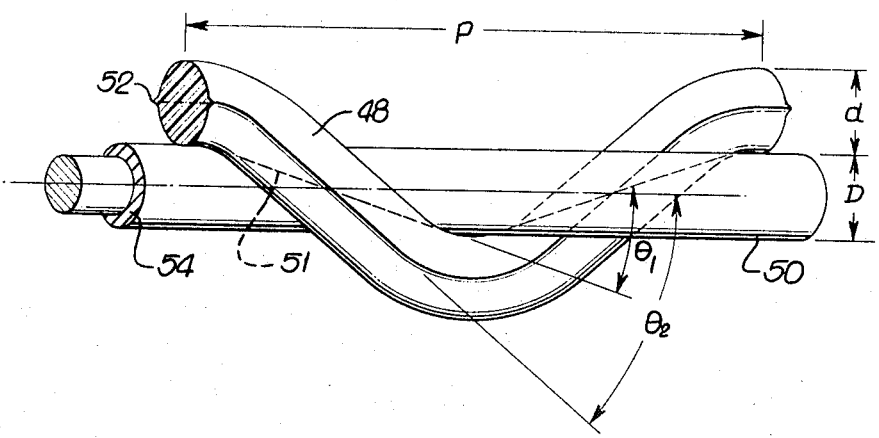
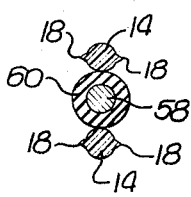
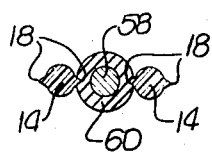
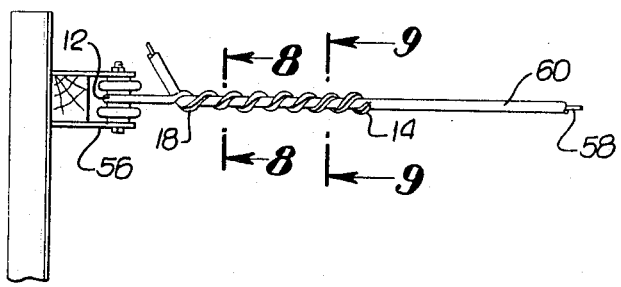

HELICAL ELEMENTS FOR A LINE CONDUCTOR

BACKGROUND OF THE INVENTION

1. Field of the Invention

This invention relates to improvements in helical elements, particularly plastic elements, used to prevent a line conductor from slipping out of the helical element.

2. Prior Art

Although various types of line conductor reinforcements have been used in the past, applicant is unaware of any prior art showing the particular structure and application of the helical element described and claimed herein.

In the past, a helical element for supporting a line conductor was formed from a specified length of strong elastic wire that had been curved as both ends into a helical wire which could be wound on a line conductor. Such a long helical element was wrapped around the line conductor and was supported on a supporting means by bringing the bent engagement portion on the mid portion of the element into engagement with the supporting means. Such a helical element had a helical portion having a plurality of long helixes having an inner diameter slightly smaller than the outer diameter of the line conductor, and a relatively large helical pitch such as 5 to 15 times as large as the outer diameter of the line conductor. Such a helical element however, when subjected to an extremely large tension load, permitted the line conductor to slip out from the helical element by turning around the curve of the helixes of the helical element and slipping out.

Accordingly, to increase the friction between the line conductor and the helical element, hard pulverized materials such as alundum were applied to the inner surface of the helix of the helical element. The application of such hard pulverized material, such as alundum, requires a difficult application step of coating the material to an adhesive which had been first applied to the surface to be coated. It was found that the hard pulverized material would fail to adhere sufficiently and often would fall out from the helical body. Since the line conductor itself is usually long and twisted, it readily rotates along with an increase or decrease in tension. Accordingly, such rotation of the line conductor would cause slippage of the line conductor from the helical element even with such hard pulverized material.

SUMMARY OF THE INVENTION

This invention overcomes the disadvantages inherent in the prior art by providing at least one projecting line or projecting spur or spine formed on the circumference of the helix in the helical portion of the plastic helical element. The projecting spur obliquely intersects a line of contact between the line conductor and the helical element.

Thus, the projecting spur formed on the inner surface of the helix is pressed against the conductor and bites into the covered portion of the conductor such that the bite of the projecting spur on the conductor obliquely intersects the axis of the conductor and also obliquely intersects the line of contact between the inner surface of the helix of the helical portion of the helical element and the axis of the line conductor.

The angle of intersection of the projecting spur and the axis of the line conductor, as compared to the angle of intersection of the line of contact of the helix and the axis of the line conductor, is always different. This may be expressed mathematically when a given outer diameter of a line conductor, $D$, is 3.6 millimeters, and the diameter of the helix, $d$, is 4.6 millimeters and the pitch of the helix, $p$, is 40 millimeters.

The angle of intersection, $\theta_1$, between the line of contact of the helix and the axis of the line conductor is expressed as:

$$\theta_1 = \tan^{-1}(\pi D/p) = 16°$$

The angle of intersection, $\theta_2$, between the projecting spur and the axis of the line conductor is expressed as:

$$\theta_2 = \tan^{-1}[\pi(D+d)/p] = 33°$$

Thus, the difference between the two angles, $\theta_2 - \theta_1$, 17°, expresses the effect of the bite of the projecting spur into the covered portion of the line conductor. It does not matter whether the angle of intersection between the projecting spur and the axis of the line conductor is greater or smaller than the angle of intersection of the line of contact of the helix with the axis of the line conductor. It is the difference between the angles that is significant, and is a measure of the holding qualities of the helical element.

Accordingly, a primary object of this invention is to provide a plastic helical element for supporting a line conductor which element is capable of positively preventing the line conductor from slipping out from the helical element due to rotation of the conductor along the helix of the helical element.

Another object of this invention is to provide a plastic helical element for supporting a line conductor, which element includes a slip-preventive means that is relatively simple and convenient both for the manufacturer and for the use of the helical element.

A further object of this invention is to provide a helical element for supporting a line conductor, which element can be substituted for metalic wire heretofore in use, and which is light in weight and high in durability.

A yet further object of this invention is to provide a dead-end grip for a line conductor which positively prevents the slipping out of the conductor from the helical element having a dead-end grip.

A yet further object of this invention is to provide a line-tie grip which positively prevents the slipping out of the line conductor from the line-tie grip.

These and other objects of the invention may be readily understood from a consideration of the following description, taken in conjunction with the accompanying drawings illustrating several preferred embodiments and also modifications therein, in which FIG. 1 is a plan view showing an embodiment of the helical element according to the invention.

FIG. 2 is a side elevational view of the helical element of FIG. 1.

FIGS. 3, 4, and 5, are plan views showing additional embodiments of helical elements of the invention.

FIG. 6 is a detailed view showing and explaining the type of contact between the long helical element of the invention and a typical line conductor.

FIG. 7 is a plan view of a dead-end grip for a line conductor formed by the use of the line conductor of FIG. 1.

FIG. 8 is a sectional view taken along line 8—8 of FIG. 7.

FIG. 9 is a sectional view taken along line 9—9 of FIG. 7.

Figure 1:
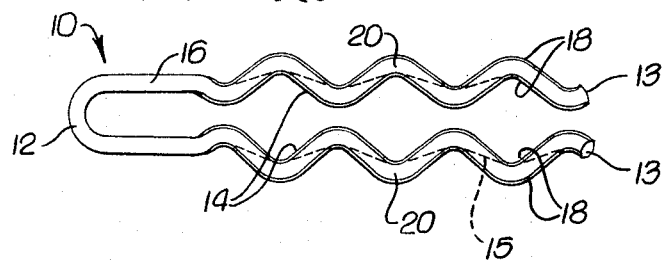
Figure 2:
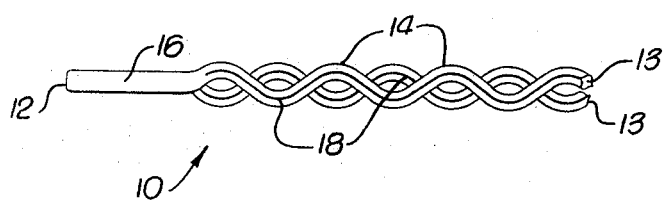

With respect to the drawings, the helical element 10 as shown in embodiments in FIGS. 1 and 2, has a bent engagement portion in the form of a loop or a bight or a U-shape 12 in the midportion of the dead-end grip at one end of helical element 10. A plurality of long helixes 14 is formed in the longitudinal direction of the helical element 10 in two prongs 13 extending from the U-shaped end 12 of the helical element and spaced in substantially parallel lines.

Each of said helixes 14 has a slightly smaller inner diameter than the outer diameter of the line conductor 15. Element wire 16 is provided on both sides with projecting lines or spurs 18 undulating along the undulations of the helixes 14 and extending to the terminal end of wire 16 in the helical portion 20 of the helical element 10.

Figure 3:
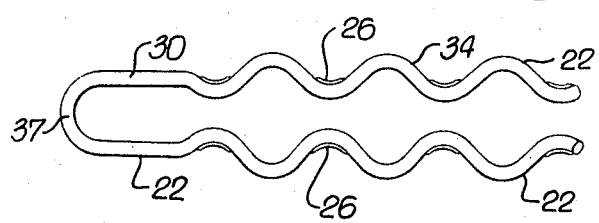
Figure 4:
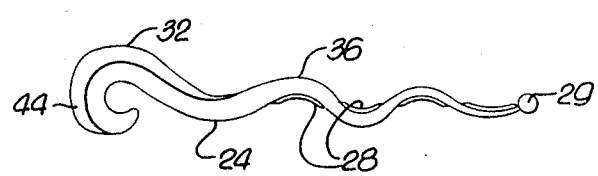
Figure 10:
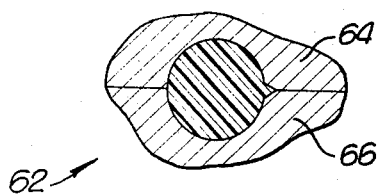
FIG. 10 is an enlarged sectional view in part of a metal mold for injection molding of the helical element of the invention.

As shown in additional embodiments in FIGS. 3 and 4, long helical elements or prongs 22 and 24 respectively are formed with projecting lines or spurs 26 and 28 respectively, alternately formed along the inner surface of the helix on both sides of the element wires 30 and 32 in the helical portions of 34 and 36.

The embodiment of FIG. 3 has a U-shaped or bent engagement portion 37 similar to that of FIG. 1.

The projecting spurs 26 and 28 as shown in FIGS. 3 and 4 are formed discontinuously and are located on the inner surface of the helix which comes into contact with the line conductor.

As shown in FIG. 4, the terminal end of the helix is formed into an enlarged spherical portion 29 to prevent unwrapping of the helix after it has been wrapped around the line conductor. The projecting spurs 28, being discontinuous in this embodiment of the invention, need not be formed at or up to the spherical portion 29. In use, the force applicable to the spherical portion 29 is much weaker than the force applied to the engagement portion 44 of this embodiment, so that the helical element of FIG. 4 is preferably reduced in diameter at the spherical portion 29 in comparison to the bent engagement portion 44 to conserve materials.

FIG. 5 of the drawings illustrates an embodiment wherein a helical element 38 is formed with a single continuous projecting spur 40 at a small pitch on the circumference of element wire 42 in one helical portion 45 of the helical element 38.

Both FIGS. 4 and 5 show embodiments wherein one end of the plastic helical element is formed into bent engagement portions 44 and 46 respectively, and at the other end into long helical portions 34 and 36 respectively.

The embodiments of the helical elements of FIGS. 4 and 5 are intended for use in forming a dead-end grip for a line conductor without the use of an insulator, by bringing the engagement portions 44 and 46 into hooks (not shown) fixed to poles, including dead-end poles and the like, and wrapping the helical portions at the other end around the line conductor.

FIG. 6 illustrates the effect of the contact of the helical element with a line conductor. As shown in FIG. 6, when the helix 48 is wrapped around the line conductor 50, the line of contact 51 between the inner surface of the long helix 48 and the line conductor 50 becomes helical, and obliquely intersects the axis of the conductor 50 at an angle theta 1. The projecting spur 52 is also helical, but has an angle of oblique intersection with the axis of the line conductor of theta 2.

The pitch of the helixes in FIG. 6 is indicated by letter $p$, and the diameter of the helical element is represented by the letter $d$, and the diameter of the line conductor is represented by the letter $D$.

The line conductor 50 shown in FIG. 6 has an outer insulation coating 54 on which the spur 52 bites or impinges.

The tip of the spur 52 is preferably formed in the shape of an equilateral triangle, having a side length of about 0.5 to 1 millimeters. The height of the spur 52 may vary from one-fourth to one-sixteenth approximately of the diameter of the helical element, depending upon the quality of the material used as insulation for the line conductor 50.

FIG. 7 shows an example of the use of a helical element of the dead-end grip type for a line conductor that is used. The loop or bight 12 of the helical element shown in FIG. 1 is brought into engagement with a supporting means 56 and the helical portion 14 is wrapped around the conductor 58. The projecting spurs 18 of the helical element 12 are pressed against the line conductor 58 and into the covered portion or insulation 60 of the conductor 58, thereby obliquely intercepting the line of contact between the inner surface of the helix 14 and the axis of the line conductor 58, in the manner shown in FIG. 6.

Because of the difference in angles between theta 2 and theta 1, conductor 58 is prevented from rotating along a helical line of contact and slipping out from the helix, even if tension is applied to the line conductor 58.

Various suitable plastics may be used to form the helical element, such as epoxy, polyester, and polycarbonate and the like. The helical element can be fortified by using metallic wire as its core. Also, the surface of the helical element may be covered with weather resistant materials.

High temperature and high pressure thermoplastic resins are injection molded in split mold 62, having an upper mold part 64 and a lower mold part 66, which are divided into two parts on the side of a loop or bight and on the side running along the undulations of the helix of the helical portion of the helical element extending from the loop or bight and slightly cut away only on that portion of the parting line of the mold which corresponds to the helical portion. The mold parts 64 and 66 are enlarged in the groove width.

The projecting spurs of the helical elements can be produced by forming a groove in the mold 62 or by forming the projecting spurs along the parting line of the split mold 62 so that flashes produced in the molding process can be used as the projecting spurs, thereby producing a substantial saving in material and time of production of the helical elements.

Also, as an alternative method of producing, plastic wire may be produced approximately circular in cross section and having at least one projecting spur on its circumference, and then twisting the wire when in a heated state into a helical shape as in FIG. 5.

In operation, a helical element may be used having at least one projecting spur, which spur may be either continuous around the circumference of the helical element, or discontinuous, provided that the spur obliquely intersects the line of contact between the line conductor and the helical element. When the helical element is wrapped around the line conductor so that the projecting spur bites into or impinges on the line conductor, rotation of the line conductor is prevented even though tension may be applied to the line conductor to cause such rotation along the helix. Thus, a strong support is provided for the line conductor by the helical element.

Although I have described various preferred embodiments of the invention, it is understood that the invention is not limited to the embodiments shown but that various changes, modifications, and additions may be made in the construction and arrangement of component parts of the invention without departing from the spirit and scope of the invention as hereinafter claimed.

I claim:

1. A helical element for supporting a line conductor, comprising:
   a linear element which is U-shaped at one end and has two prong members spaced substantially parallel to each other;
   a plurality of helixes having undulating helical portions formed in both of said prong members; and
   a single projecting spur of continuous form formed along the inner surface of said undulating helical portions of at least one of said prong members and adapted to intersect the axis of said line conductor when the helical element is wrapped around said line conductor, said projecting spur undulating longitudinally along said undulating helical portions.

2. A helical element according to claim 1 in which the angle of intersection between said projecting spur and the axis of said line conductor is greater than the angle of intersection between the line of contact of the helixes of said helical portions and the axis of said line conductor.

3. A helical element for supporting a line conductor, comprising:
   a linear element having a plurality of helixes having undulating helical portions formed along its longitudinal axis and terminating at one end in a bent engagement member and at the other end in an enlarged spherical member; and
   a single projecting spur of continuous form formed along the inner surface of said undulating helical portions and adapted to intercept the axis of said line conductor when the helical element is wrapped around said line conductor, said projecting spur undulating longitudinally along said undulating helical portions.

4. A helical element according to claim 3 in which the angle of intersection between said projecting spur and the axis of said line conductor is greater than the angle of intersection between the line of contact of the helixes of said helical portions and the axis of said line conductor.

5. A helical element for supporting a line conductor, comprising:
   a linear element having a plurality of helixes having undulating portions formed along its longitudinal axis and terminating at one end in a bent engagement member, and
   a single projecting spur of continuous form formed along said undulating helical portions and adapted to intercept the axis of said line conductor when the helical element is wrapped around said line conductor, said projecting spur undulating longitudinally along said undulating helical portions.

6. A helical element according to claim 5 in which the angle of intersection between said projecting spur and the axis of said line conductor is greater than the angle of intersection between the line of contact of the helixes of said helical portions and the axis of said line conductor.

7. In a helical element of the type having a plurality of helixes with helical portions for supporting a line conductor when the helical element is wrapped around said line conductor, the improvement comprising:
   a linear element having undulating helical portions formed along its longitudinal axis and terminating at one end in a bent engagement member, and
   a single projecting spur of continuous form formed along the inner surfaces of said helical portions and having a height varying from one-fourth to one-sixteenth of the diameter of the helical element, said projecting spur undulating longitudinally along said undulating helical portions.

8. A helical element according to claim 7 in which the projecting spur is formed in the shape of a triangle.

9. A helical element according to claim 7 in which the projecting spur is formed in the shape of an equilateral triangle.

* * * * *